United States Patent [19]

Murata

[11] Patent Number: 5,045,875
[45] Date of Patent: Sep. 3, 1991

[54] CAMERA WITH AUTOMATIC FOCUSING DEVICE

[75] Inventor: Yoshitaka Murata, Kanagawa, Japan

[73] Assignee: Canon Kabushiki Kaisha, Tokyo, Japan

[21] Appl. No.: 525,311

[22] Filed: May 18, 1990

Related U.S. Application Data

[63] Continuation of Ser. No. 292,008, Dec. 30, 1988, abandoned.

[30] Foreign Application Priority Data

Jan. 11, 1988 [JP] Japan .................................. 63-003426
Jan. 18, 1988 [JP] Japan .................................. 63-007900
Jan. 20, 1988 [JP] Japan .................................. 63-010042

[51] Int. Cl.$^5$ ........................ G03B 7/095; G03B 13/36
[52] U.S. Cl. .................................... 354/400; 354/412; 354/443; 354/446
[58] Field of Search ............... 354/412, 443, 400, 402, 354/446

[56] References Cited

U.S. PATENT DOCUMENTS

| 4,329,034 | 5/1982 | Murakami et al. | 354/443 |
| 4,358,188 | 11/1982 | Uchidoi et al. | 354/443 |
| 4,437,744 | 3/1984 | Terui et al. | 354/412 X |
| 4,593,987 | 6/1987 | Takahashi et al. | 354/443 X |

Primary Examiner—W. B. Perkey
Attorney, Agent, or Firm—Fitzpatrick, Cella, Harper & Scinto

[57] ABSTRACT

A camera having an automatic focusing device is arranged to inhibit the diaphragm aperture thereof from being controlled and set during the process of automatic focusing at any aperture value near to a full aperture value at which the focusing accuracy of the automatic focusing device is hardly warrantable, so that photographing can be carried out always in an in-focus condition.

6 Claims, 5 Drawing Sheets

CAMERA WITH AUTOMATIC FOCUSING DEVICE

This application is a continuation of application Ser. No. 292,008 filed Dec. 30, 1988, now abandoned.

BACKGROUND OF THE INVENTION

1. Field of the Invention

This invention relates to an exposure control system of a camera having an automatic focusing (hereinafter referred to as AF) function.

2. Description of the Related Art

Cameras are generally arranged these days to perform automatic exposure (hereinafter referred to as AE) control and the AF control. A sharply focused picture can be taken by just pushing a shutter release button with camera directed to an object to be photographed. The AE control of the camera is performed either in a standard program mode in which an aperture value and a shutter time value are determined in accordance with a given program line in such a way as to have an exposure value obtained from the luminance of an object and the sensitivity of such photo sensitive means as a silver-halide film or the like on the basis of the output of a photometric sensor disposed within the camera, or in an aperture-priority program mode in which the photographer is allowed to set an aperture value as desired.

In the case of a single-lens reflex camera, for example, the AF control is performed in general by a phase difference detecting method in which a focusing lens is driven and controlled by detecting the light of the object obtained through a photo-taking lens by an AF sensor.

The camera of the kind using a silver-halide film generally has an allowable diameter of circle of confusion set at 35 $\mu$ or thereabout. Therefore, assuming that a photo-taking lens of F1.2 is mounted on the camera, for example, the allowable defocus degree of the camera becomes $35\mu \times 1.2 = 42$ $\mu$. The allowable defocus degree becomes larger accordingly as the aperture value of the photo-taking lens in use comes further away from the full aperture value of the lens.

Meanwhile, the focusing accuracy (AF accuracy) of the AF device operated by the above-stated phase difference detecting method is determined by the resolution of the AF sensor, the optical system, a processing algorithm, etc. The accuracy generally guaranteed nowadays is about 100 $\mu$ in terms of the defocus degree. With a silver-halide film, therefore, the AF accuracy cannot be guaranteed without setting the aperture at a value which is at least F2.8 or higher. Especially in the case of an electronic still camera which is arranged to use an image sensor such as a CCD as photo-sensing means, to convert the object's light into an image signal by photo-electric conversion and to record the video signal on a recording medium such as a magnetic disc or the like, the allowable diameter of circle of confusion is only about half of that of the camera using silver-halide film although it varies with the frequency band of the image signal. The aperture value at which the AF accuracy is warrantable for an electronic still camera is thus likely to greatly differ from the full aperture F number of the photo-taking lens.

Therefore, with an aperture value set at the full aperture F number or at a value close thereto either manually by the photographer in the aperture-priority program mode or automatically in the standard program mode according to the object's condition, a picture thus taken in the past has sometimes come out of focus even under a correct exposure condition.

SUMMARY OF THE INVENTION

It is an aspect of the invention to provide a camera having an aperture control device which is arranged to prevent the aperture position of a diaphragm from shifting closer to the full aperture thereof than a given aperture value during aperture control in an AF mode and to allow the camera to carry out photographing in an in-focus state by always having a deep depth of focus.

It is another aspect of the invention to provide a camera arranged to indicate any state of having a diaphragm aperture shifted closer to a full aperture than a given aperture value during aperture control in an AF mode and then to give a warning against the state in which in-focus photographing is hardly warrantable.

It is a further aspect of the invention to provide an exposure control system for a camera having distance measuring means of a passive phase difference detecting method for detecting a distance to an object to be photographed; a program part including a program line for determining an aperture value and a shutter speed; and exposure control means which is arranged to set an exposure value and a shutter speed on the basis of a photometric value obtained by measuring the luminance of the object and the program line of the program part. The exposure control system of the camera is characterized in that the program line of the program part has the lower limit of the aperture value set at a value larger than the full aperture F number of a photo-taking lens.

These and other aspects or objects and features of this invention will become apparent from the following detailed description of embodiments thereof taken in connection with the accompanying drawings.

DETAILED DESCRIPTION OF THE PREFERRED EMBODIMENT

Figure 1:
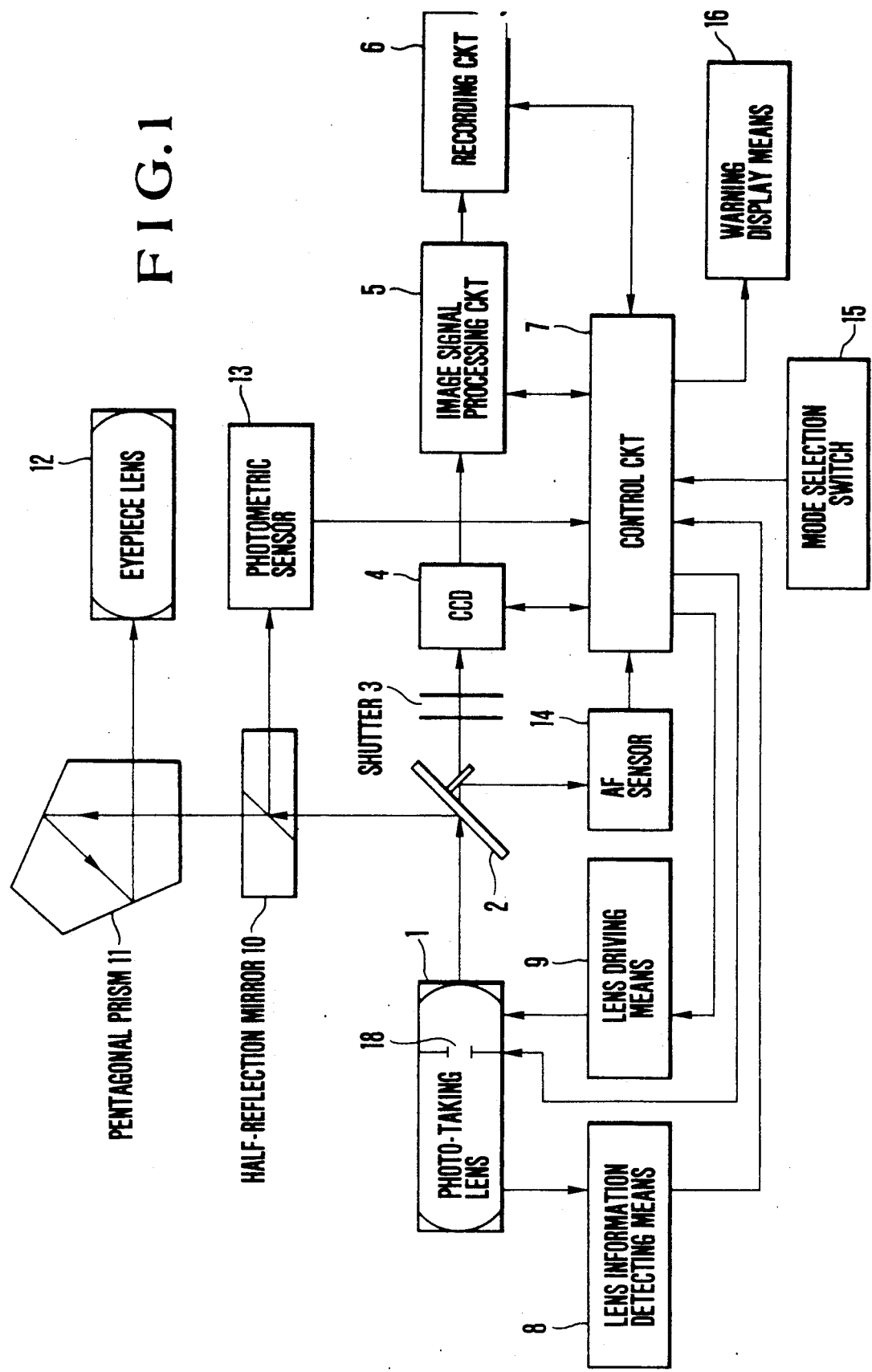
FIG. 1 is a block diagram showing the construction of a camera having an aperture control device arranged according to this invention as an embodiment thereof.

FIG. 1 shows an electronic camera arranged according to this invention as an embodiment thereof. Referring to FIG. 1, the illustration includes a photo-taking lens 1; a quick-return mirror 2; a shutter 3; an image sensor (CCD) 4; an image signal processing circuit 5; a recording circuit 6; a control circuit 7; lens information detecting means 8; lens driving means 9; a half-reflection mirror 10; a pentagonal prism 11; an eyepiece lens 12; a photometric sensor 13; an AF sensor 14; a mode selection switch 15; and warning display means 16. A diaphragm 18 is disposed within the lens 1.

In the electronic camera which is arranged as shown in FIG. 1, the mode selection switch 15 is provided for selection of a mode from among, for example, an exposure-priority program mode, an AF-priority program mode and a manual mode. The switch 15 thus permits the operator of the camera to select one of these operation modes according to his or her intention.

In the exposure-priority program mode, an aperture value and a shutter speed are determined in such a way as to ensure an apposite exposure in accordance with a predetermined program on the basis of a photometric value obtained from the photometric sensor 13. In this instance, the aperture is set at an optimum value which is not less than the full aperture F number of the phototaking lens. There is no limitation on the photographing area.

However, in cases where the aperture is set at the full aperture F number of the lens or at a value near thereto, the depth of focus becomes shallow. Under such a condition, an adequate degree of AF accuracy might become unwarrantable. In such a case, the warning display means 16 shows a warning within a view finder to urge the photographer either to take a stopping-down correcting action on the diaphragm aperture or a manual focus correcting action.

In the AF-priority program mode, an aperture value and a shutter speed are set on the basis of the photometric value of the photometric sensor 13 in accordance with another predetermined program line in such a way as to ensure an apposite exposure. In that instance, the aperture value (on the side of the full aperture) is set at a value guaranteeing an adequate AF accuracy. For example, assuming that the accuracy of the AF device is 40 $\mu$ in terms of the degree of defocus and an allowable diameter of circle of confusion is 20 $\mu$, an aperture value closer to the full aperture F number than F2 does not assure an adequate degree of AF accuracy and might result in a picture which is out of focus. In the AF-priority program, therefore, the lower limit of the aperture value on the side of the full aperture F number is set at F2.

Figure 2:
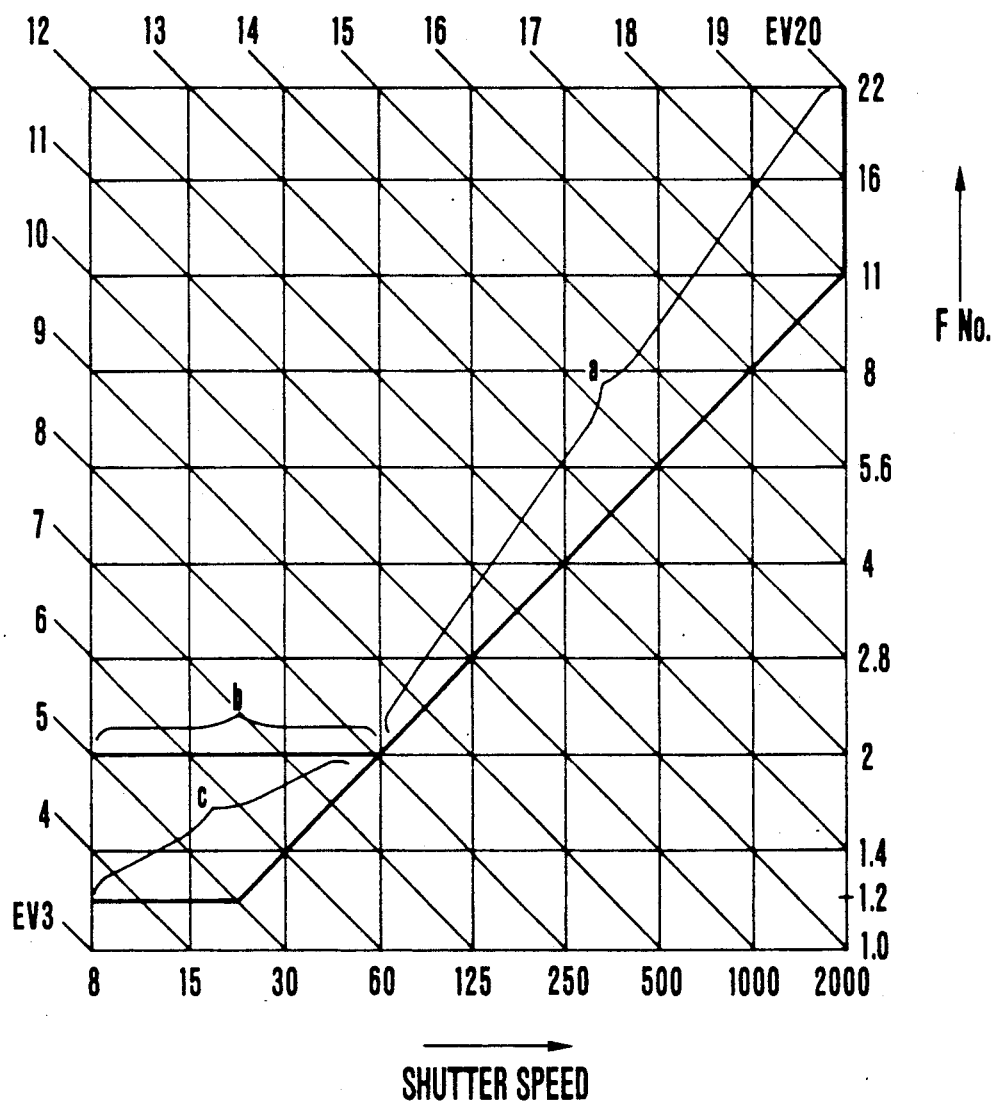
FIG. 2 is an illustration of program lines to be used by the embodiment of the invention shown in FIG. 1.

FIG. 2 shows the exposure program lines to be used by the embodiment. In FIG. 2, a-c denotes an exposure-priority program line, and a-b denotes an AF-priority program line.

Figure 3:
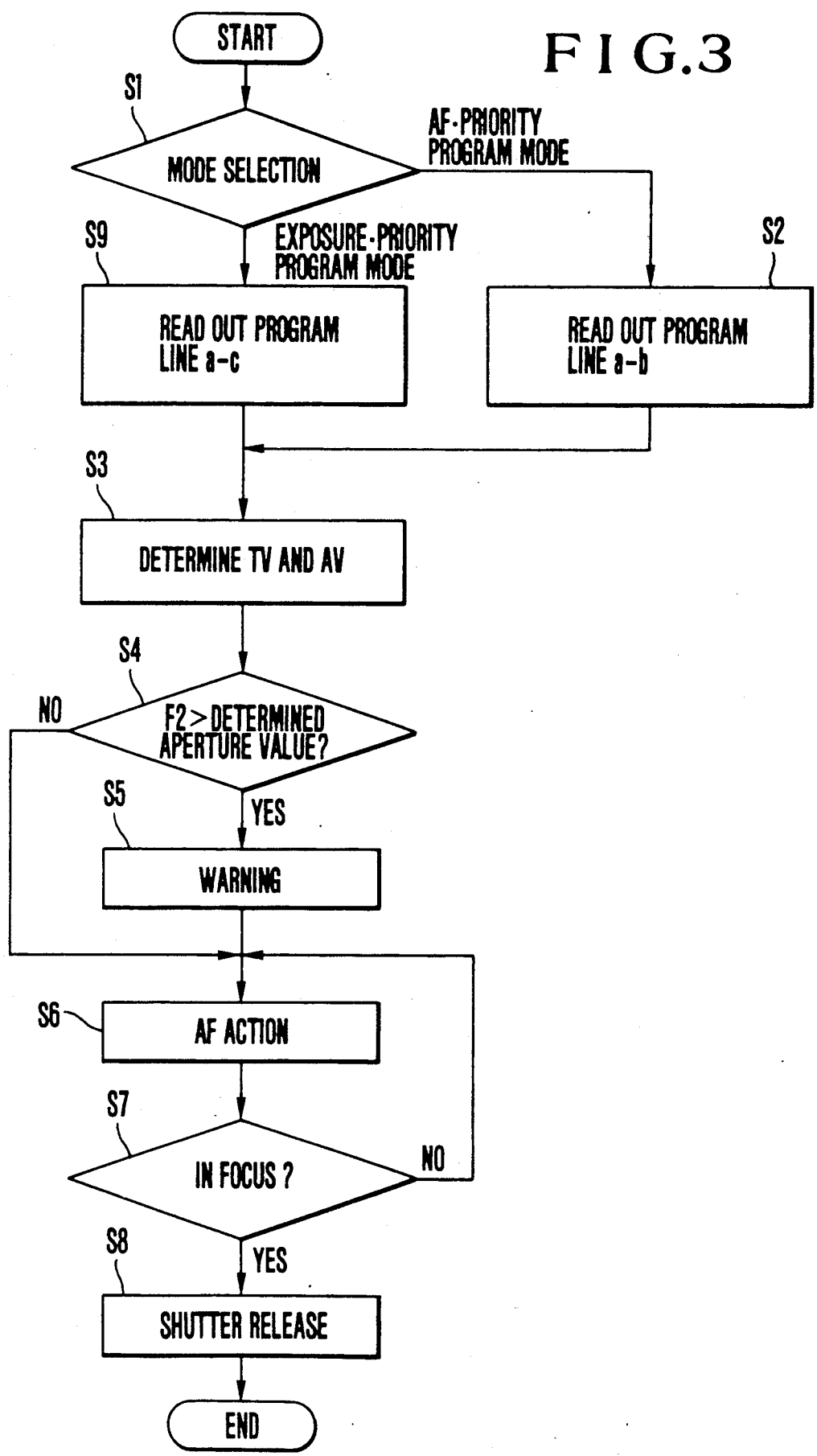
FIG. 3 is a program flow chart showing an operation of the embodiment shown in FIG. 1.

FIG. 3 is a flow chart showing the flow of the operating processes of the control circuit 7 arranged according to this invention. As mentioned in the foregoing, the exposure-priority program mode or the AF-priority program mode is selected by means of the mode selection switch 15. The program mode thus selected is read out, and an aperture value and a shutter speed required for an apposite exposure are determined on the basis of a measured light value obtained from the photometric sensor 13. In the exposure-priority program mode, if the aperture value is set at a value nearer to the full aperture F number than an AF accuracy assuring value as indicated by a segment c of the program line a-c, a warning is given by the warning display means 16. The photographer is then urged by this warning either to make an aperture stopping-down correction or to take a manual focus correcting action. However, in a case where priority is given to an exposure without taking such a correcting action in particular, an AF action is performed and a shutter release is made after an in-focus state is obtained.

The details of the above-stated operation are as follows: A microcomputer which is employed as the control circuit 7 is rendered operative to execute the program of FIG. 3 when a power supply switch which is not shown is turned on. Referring to the flow chart of FIG. 3, a check is made for the setting position of the mode selection switch 15 in a step S1. If the AF-priority program mode is found to be selected by the mode selection switch 15, the flow of operation proceeds to a step S2. The switch 15 is assumed to be arranged to turn on in selecting the AF-priority program mode and to turn off in selecting the exposure-priority program mode. Therefore, the flow proceeds to the step S2 as mentioned above with the switch 15 found to be in an on-state. Meanwhile, under this condition, a light flux obtained through the lens 1 comes to be incident upon the photometric sensor 13 via the mirror 2 and the half mirror 10. This causes the sensor 13 to produce an output according to the luminance of the object to be photographed. The computer 7 contains therein the program line which corresponds to the luminance of the object detected by the above stated sensor 13. A shutter speed and an aperture value are determined on the basis of the program line. Since the AF-priority program mode is selected in this instance, the program line a-b is read out. Then, a segment "a" of the program line a-b is selected for exposure values from EV20 to EV8 and another segment "b" for exposure values below the exposure value EV8.

After the program line a-b is thus read out at the step S2, the flow proceeds to a step S3. At the step S3: An aperture value and a shutter speed corresponding to the luminance of the object currently detected are determined according to the program line a-b. In this mode, the aperture value is restrained from being set at a value closer to the full aperture F number than F2 as mentioned in the foregoing. This, therefore, enables photographing to be carried out with a sufficiently deep depth of focus to ensure adequate AF accuracy. The flow then comes to a step S6 through steps S4 and S5 to perform an AF action.

Although the AF action is well known requiring no detailed description, it is briefly described as follows: A signal corresponding to a light image which is incident on the AF sensor 14 coming via the lens 1 and the mirror 2 is supplied to the computer 7. A degree of defocus is obtained from this signal. Then, the lens driving means 9 which is a motor is operated according to the defocus degree thus obtained. The lens driving means or motor 9 drives the lens 1 to bring it into an in-focus state. The AF action is repeated until the in-focus state is found to have been obtained at a step S7. After the step S7, the flow comes to a step 8. At the step 8: A shutter release action is performed in a known manner to have photographing accomplished at the aperture value and the shutter speed which have been determined at the step S3.

In a case where the mode selection switch 15 is turned off to select the exposure-priority program mode, the embodiment operates as follows: In this case, the flow of operation comes to a step S9 instead of the step S2. At the step 9: The program line a-c of FIG. 2 is selected for the exposure-priority program mode. Then, the flow comes to the step S3 to determine an aperture value and a shutter speed on the basis of the current luminance of the object in accordance with the program line a-c. At the next step S4: A check is made to see if the aperture value determined at the step S3 is a value within a segment "c" of the program line a-c. In other words, a check is made for a relation of "F2 > the determined aperture value". If the determined aperture value is thus found to be less than F2, the flow proceeds to the step S5. At the step S5: The warning display means 16 is rendered operative to show the possibility of a deviation from an in-focus state. After that, the steps S6 to S8 are executed in the same manner as in the case of the AF-priority program mode. Therefore, description of the steps S6 to S8 is omitted.

Figure 4:
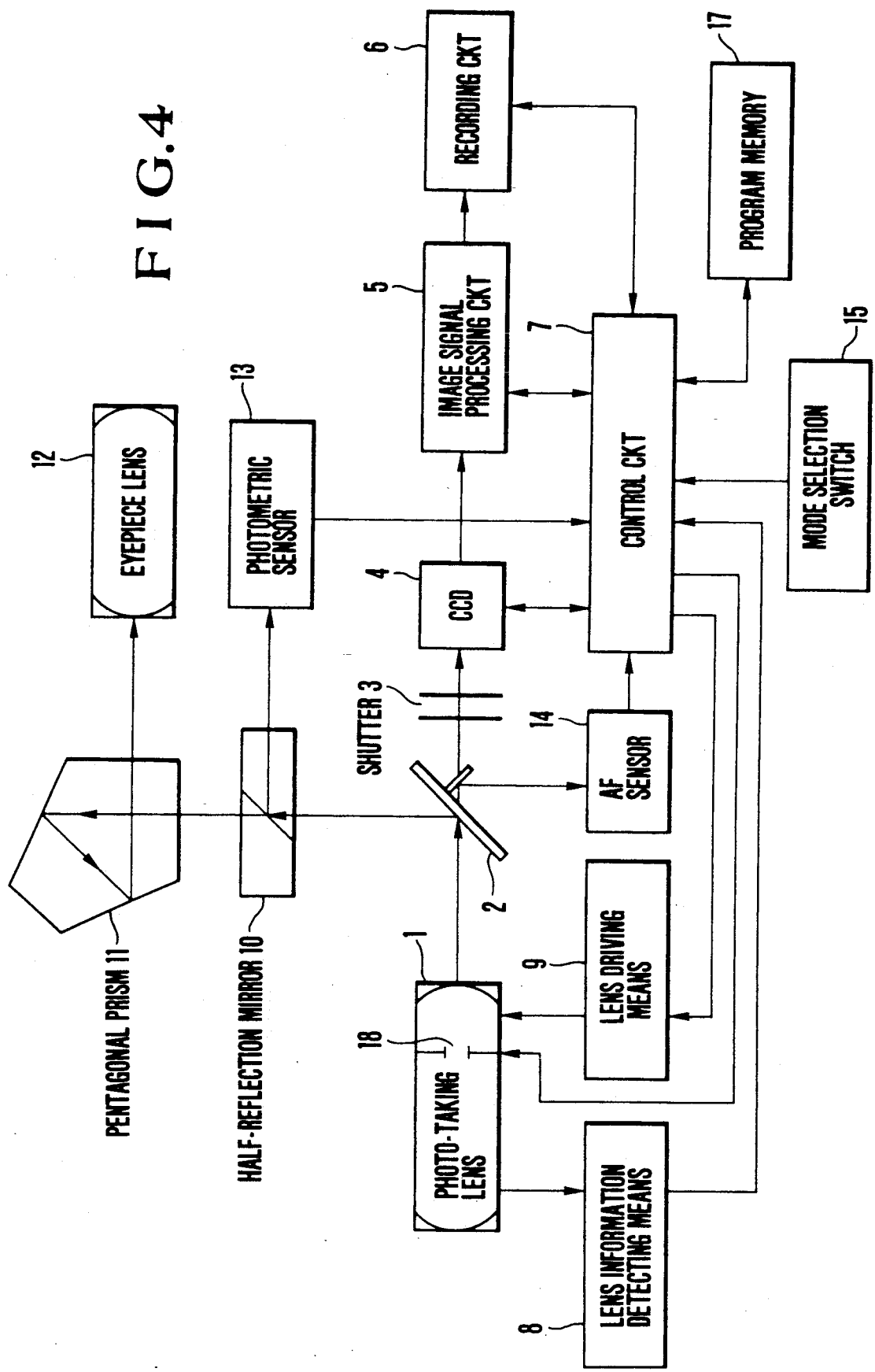
FIG. 4 is a block diagram showing the construction of another embodiment of the invention.

Another embodiment of the invention is arranged as shown in FIG. 4, in which the same component parts as those of the embodiment shown in FIG. 1 are indicated by the same reference numerals. In FIG. 4, a reference numeral 17 denotes a program memory. In the program memory 17 are stored the program line a-b for AF-priority program mode and the program line a-c for the exposure-priority program mode which are the same as the lines shown in FIG. 2. One of these program lines is arranged to be read out by the computer (or the control circuit) 7 according to the program mode selected by the turning-on or -off of the mode selection switch 15.

Figure 5:
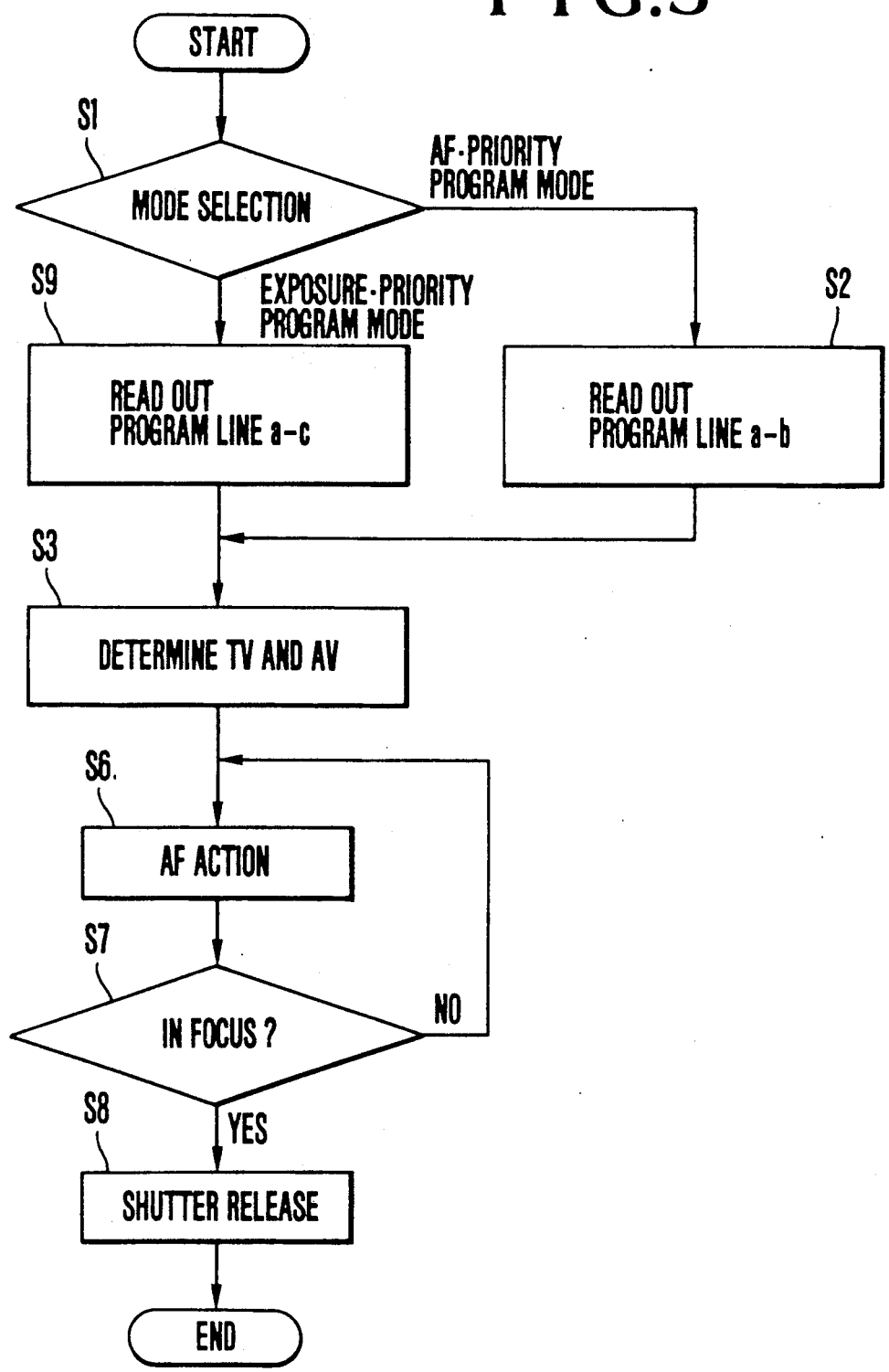
FIG. 5 is a program flow chart showing an operation of the embodiment shown in FIG. 4.

FIG. 5 shows in a flow chart a program contained within the computer 7 of the embodiment shown in FIG. 4. The program is arranged approximately in the same manner as the program shown in FIG. 3 and described in the foregoing. Therefore, the details of the program are omitted from the following description of the program: At a step S2 or S9: The program line a-b or a-c is read out from the program memory 17. At a step S3: A shutter speed and an aperture value are determined according to the program line read out from the program memory 17. In the case of this program, the steps S4 and S5 of FIG. 3 are omitted. Therefore, the warning display action which is described in the foregoing is omitted in this case.

What is claimed is:

1. A camera comprising:
   a light measuring circuit;
   an automatic focusing circuit for automatically effecting focal adjustment for an object to be photographed;
   an exposure control circuit for controlling an aperture on the basis of an output of said light measuring circuit, said control circuit having a first mode for controlling the aperture within a range from a full aperture value to a predetermined stopped down aperture value, and a second mode for controlling the aperture within a range from an aperture value stopped down by a predetermined step from the full aperture value to said predetermined stopped down aperture value; and
   a selection member for selecting said first mode or said second mode while said automatic focusing circuit is operating.

2. A camera according to claim 1, wherein said exposure control circuit comprises a programmed exposure control circuit which determines a combination of an aperture value and a shutter time.

3. A camera comprising:
   a light measuring circuit;
   an automatic focusing circuit for automatically effecting focal adjustment for an object to be photographed;
   an exposure control circuit for controlling an aperture on the basis of an output of said light measuring circuit, said control circuit having a first mode for controlling an aperture within a range from a first aperture value to a second aperture value stopped down by a predetermined amount from the first aperture value, and a second mode for controlling the aperture value within a range from a third aperture value stopped down by a predetermined stop from the first aperture value to a fourth aperture value stopped down by a predetermined amount from the third aperture value; and
   a selection member for selecting the first mode or the second mode irrespective of an operative or non-operative state of said automatic focusing circuit.

4. A camera according to claim 3, wherein said second aperture value and said fourth aperture value are substantially the same.

5. A camera comprising:
   a light measuring circuit;
   an automatic focusing circuit for automatically effecting focal adjustment for an object to be photographed;
   an exposure control circuit for controlling an aperture on the basis of an output of said light measuring circuit, said control circuit having a first mode for controlling an aperture within a range from a first aperture value to a second aperture value stopped down by a predetermined amount from the first aperture value, and a second mode for controlling the aperture value within a range from a third aperture value stopped down by a predetermined stop from the first aperture value to a fourth aperture value stopped down by a predetermined amount from the third aperture value; and
   a selection member for selecting said first mode or said second mode while said automatic focusing circuit is operating.

6. A camera according to claim 5, wherein said second aperture value and the fourth aperture value are substantially the same.

* * * * *

UNITED STATES PATENT AND TRADEMARK OFFICE
CERTIFICATE OF CORRECTION

PATENT NO. : 5,045,875

DATED : September 3, 1991

INVENTOR(S) : Yoshitaka Murata

It is certified that error appears in the above-identified patent and that said Letters Patent is hereby corrected as shown below:

COLUMN 1:

Line 16, "the" should be deleted.

Line 18, "camera" should read --the camera--.

Line 24, "photo sensitive" should read --photosensitive--.

COLUMN 2:

Line 51, "EMBODIMENT" should read --EMBODIMENTS--.

COLUMN 4:

Line 46, "step 8:" should read --step S8:-- and "step 8:" should read --step S8:--.

Line 55, "step 9:" should read --step S9:--.

Signed and Sealed this

Sixteenth Day of March, 1993

*Attest:*

STEPHEN G. KUNIN

*Attesting Officer*    *Acting Commissioner of Patents and Trademarks*